United States Patent
Fukuda et al.

(10) Patent No.: US 10,704,835 B2
(45) Date of Patent: Jul. 7, 2020

(54) METHOD OF SPRAY DRYING AND WASHING AND METHOD OF CONTROLLING AIR POLLUTION

(71) Applicant: MITSUBISHI HEAVY INDUSTRIES, LTD., Tokyo (JP)

(72) Inventors: Toshihiro Fukuda, Tokyo (JP); Seiji Kagawa, Tokyo (JP); Jun Satou, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 58 days.

(21) Appl. No.: 16/020,364

(22) Filed: Jun. 27, 2018

(65) Prior Publication Data
US 2018/0306509 A1    Oct. 25, 2018

Related U.S. Application Data (62) Division of application No. 14/647,697, filed as application No. PCT/JP2013/081067 on Nov. 18, 2013, now abandoned.

(30) Foreign Application Priority Data

Nov. 30, 2012 (JP) .................................. 2012-263271

(51) Int. Cl.
*F26B 25/00* (2006.01)
*B01D 1/18* (2006.01)
(Continued)

(52) U.S. Cl.
CPC .............. *F26B 25/009* (2013.01); *B01D 1/18* (2013.01); *B01D 53/343* (2013.01);
(Continued)

(58) Field of Classification Search
None
See application file for complete search history.

(56) References Cited

U.S. PATENT DOCUMENTS

| | | | |
|---|---|---|---|
| 4,002,524 A | 1/1977 | Damgaard-Iversen et al. | |
| 5,264,078 A | * 11/1993 | Bayliss | F26B 3/12 |
| | | | 159/4.02 |

(Continued)

FOREIGN PATENT DOCUMENTS

| | | |
|---|---|---|
| JP | 63-200818 A | 8/1988 |
| JP | H08-299701 A | 11/1996 |

(Continued)

OTHER PUBLICATIONS

International Search Report dated Feb. 10, 2014, issued in counterpart application No. PCT/JP2013/081067, (1 page).
(Continued)

*Primary Examiner* — Matthew D Krcha
(74) *Attorney, Agent, or Firm* — Westerman, Hattori, Daniels & Adrian, LLP (57) ABSTRACT

A method of spray drying and washing using a spray drying apparatus, includes: spraying dehydrated filtrate from a spray nozzle hung down from a top side of the spray drying apparatus; introducing a part of flue gas into the spray drying apparatus to dry the dehydrated filtrate; wherein a compressed air is introduced into the spray nozzle to facilitate the spraying and into the wash nozzle to perform air purging during the spray drying, and jetting washing liquid from a wash nozzle provided on a side wall of the spray drying apparatus to wash the spray nozzle and an inside of the spray drying apparatus body, wherein the feeding of the dehydrated filtrate to the spray nozzle is stopped during the washing.

4 Claims, 6 Drawing Sheets

(51) Int. Cl.
*B01D 53/50* (2006.01)
*B01D 53/34* (2006.01)
*F23J 15/00* (2006.01)
*F23J 15/02* (2006.01)
*C02F 103/18* (2006.01)
*B01D 53/64* (2006.01)
*B01D 53/75* (2006.01)
*B01D 53/86* (2006.01)

(52) U.S. Cl.
CPC ......... *B01D 53/504* (2013.01); *B01D 53/505* (2013.01); *F23J 15/006* (2013.01); *F23J 15/022* (2013.01); *B01D 53/64* (2013.01); *B01D 53/75* (2013.01); *B01D 53/8625* (2013.01); *B01D 2251/2062* (2013.01); *B01D 2251/2067* (2013.01); *B01D 2251/404* (2013.01); *B01D 2251/604* (2013.01); *B01D 2257/2045* (2013.01); *B01D 2257/302* (2013.01); *B01D 2257/404* (2013.01); *B01D 2257/602* (2013.01); *B01D 2258/0283* (2013.01); *C02F 2103/18* (2013.01)

(56) References Cited

U.S. PATENT DOCUMENTS

| | | | |
|---|---|---|---|
| 5,924,216 | A | 7/1999 | Takahashi |
| 6,058,624 | A | 5/2000 | Bach et al. |
| 2003/0124193 | A1* | 7/2003 | Snyder .................. A61K 9/0075 424/489 |
| 2003/0180283 | A1 | 9/2003 | Batycky et al. |
| 2012/0240761 | A1* | 9/2012 | Ukai ........................ B01D 1/14 95/16 |

FOREIGN PATENT DOCUMENTS

| | | |
|---|---|---|
| JP | H0966201 A | 3/1997 |
| JP | 09-313881 A | 12/1997 |
| JP | 2003-302163 A | 10/2003 |
| JP | 2008-114189 A | 5/2008 |
| JP | 2012-250141 A | 12/2012 |
| WO | 2012/128257 A1 | 9/2012 |
| WO | 2012/165509 A1 | 12/2012 |

OTHER PUBLICATIONS

Written Opinion dated Feb. 10, 2014, issued in counterpart application No. PCT/JP2013/081067, (5 pages).
English translation of Written Opinion dated Feb. 10, 2014, issued in counterpart International Application No. PCT/JP2013/081067 filed in IDS on May 27, 2015 (6 pages).
Deicison to Grant a Patent dated Apr. 26, 2016, issued in Japanese Patent Application No. 2012-263271, with English translation. (5 pages).
Extended (supplementary) European Search Report dated Jun. 24, 2016, issued in counterpart European Patent Application No. 13858567.4. (8 pages).

\* cited by examiner

TO EFFLUENT TREATMENT TANK 73

TO EFFLUENT TREATMENT TANK 73

FIG.7

METHOD OF SPRAY DRYING AND WASHING AND METHOD OF CONTROLLING AIR POLLUTION

CROSS-REFERENCE TO RELATED APPLICATION

This application is a Divisional of U.S. application Ser. No. 14/647,697, filed on May 27, 2015, and wherein U.S. application Ser. No. 14/647,697 is a national stage application filed under 35 U.S.C. § 371 of International Application No. PCT/JP2013/081067, filed on Nov. 18, 2013, which is based upon and claims the benefit of priority of the prior Japanese Patent Application No. 2012-263271, filed on Nov. 30, 2012, the entire contents of which are incorporated herein by reference.

FIELD

The present invention relates to a spray drying apparatus for dehydrated filtrate generated in flue gas treatment for treating flue gas discharged from a boiler, and an air pollution control system.

BACKGROUND

An air pollution control system for treating flue gas discharged from a boiler installed in a thermal power plant, or the like, has been conventionally known. Such an air pollution control system includes: a denitrator for removing nitrogen oxides from the flue gas from the boiler; an air heater for recovering heat of the flue gas passed through the denitrator; a precipitator for removing ash dust in the flue gas after the heat recovery; and a desulfurizer for removing sulfur oxides in the dust-removed flue gas. A typical desulfurizer used is a wet-type desulfurizer that removes sulfur oxides in flue gas by causing gas-liquid contact between limestone absorbent, for example, and the flue gas.

Effluent discharged from the wet-type desulfurizer (hereinafter it is referred to as "absorber slurry.") contains a large amount of various kinds of toxic substances including ions, such as chlorine ions or ammonium ions, and mercury. Thus, there is a need to remove these toxic substances from the desulfurized effluent before such desulfurized effluent is discharged to the outside of the system. However, treatment for removing such many kinds of toxic substances contained in the desulfurized effluent is a complicated process and its treatment cost is therefore high. In view of this, a method for treating desulfurized effluent within a system without discharging the desulfurized effluent to the outside of the system has been proposed to save the treatment cost of the desulfurized effluent. For example, Patent Literatures 1 and 2 each disclose an air pollution control apparatus in which a facility for spraying and gasifying desulfurized effluent is separately installed so as to be branched from a main line flue gas duct to which a denitrator, an air heater, a precipitator, and a desulfurizer are connected, part of flue gas is introduced into this facility from the main line flue gas duct, desulfurized effluent is sprayed and evaporated in the flue gas in the facility to precipitate toxic substances, and then the gas is returned to the main line flue gas duct (Patent Literatures 1 and 2).

CITATION LIST

Patent Literature

Patent Literature 1: Japanese Patent Application Laid-open No. Sho. 63-200818

Patent Literature 2: Japanese Patent Application Laid-open No. Hei. 9-313881

SUMMARY

Technical Problem

Although, in the air pollution control apparatuses of Patent Literatures 1 and 2, the facility for branching part of flue gas from the flue gas duct and spraying and gasifying desulfurized effluent (or sump solution) from the desulfurizer is provided to evaporate the desulfurized effluent, the desulfurized effluent from the desulfurizer contains a solid component, thus leading to a problem in which satisfactory spray drying is prevented.

Furthermore, in recent years, no drainage in air pollution control facilities has been much-needed due to the tightening of effluent regulations. Thus, the advent of a stably-operable air pollution control facility that achieves no drainage has been much-needed.

A spray dryer for drying desulfurized effluent can be used as such a facility that achieves no drainage. When desulfurized effluent is spray-dried with flue gas from a boiler, however, there are problems as follows.

The flue gas from the boiler contains ash at a high concentration. Additionally, when the desulfurized effluent is evaporated, a large amount of precipitated salt contained in the effluent is generated, possibly resulting in deposit or the generation of scale inside the spray dryer.

The inside of the apparatus can be washed during the operation of the boiler by partitioning an inlet and an outlet of the apparatus with dampers, or the like. In terms of safety, however, it is difficult for an operator to directly enter the inside of the spray dryer and conduct a washing operation. There is also a need to take a measure to finish washing in a short period of time.

In view of the above problems, it is an object of the present invention to provide a spray drying apparatus for dehydrated filtrate and an air pollution control system capable of achieving no drainage of desulfurized effluent from a desulfurizer.

Solution to Problem

According to a first aspect of the present invention in order to solve the above-mentioned problems, there is provided a spray drying apparatus for dehydrated filtrate, including: a spray nozzle for spraying dehydrated filtrate into a spray drying apparatus body; an introducing port provided in the spray drying apparatus body, for introducing flue gas to dry the dehydrated filtrate sprayed from the spray nozzle; a drying region formed in the spray drying apparatus body, for drying the sprayed dehydrated filtrate with the flue gas; a discharge port for discharging the flue gas contributed to the drying; and a washing unit for washing the spray nozzle and the inside of the apparatus body with washing liquid.

According to a second aspect of the present invention, there is provided the spray drying apparatus for dehydrated filtrate according to the first aspect, including: a detection unit for detecting spray failure in the spray nozzle or dry failure; a determination unit for determining whether spraying and drying states of the dehydrated filtrate are good or bad on the basis of a detection result from the detection unit; and a control unit for suggesting or instructing washing of the spray nozzle and the inside of the apparatus body by the washing unit when it is determined to be the spray and dry failure as a result of the determination made by the determination unit.

According to a third aspect of the present invention, there is provided the spray drying apparatus for dehydrated filtrate according to the first or second aspect, wherein the detection unit is any one of, or a combination of, a differential pressure gauge, a gas thermometer, a gas moisture meter, and a thermometer on a surface of the apparatus body.

According to a fourth aspect of the present invention, there is provided the spray drying apparatus for dehydrated filtrate according to any one of the first to third aspects, including: a cooling unit for cooling the inside of the apparatus body heated by air blow of the flue gas.

According to a fifth aspect of the present invention, there is provided the spray drying apparatus for dehydrated filtrate according to any one of the first to fourth aspects, wherein the discharge port is inclined toward an upper side of the spray drying apparatus body from a horizontal direction.

According to a sixth aspect of the present invention, there is provided the spray drying apparatus for dehydrated filtrate according to any one of the first to fifth aspects, wherein the washing liquid is any one of, or a combination of, the dehydrated filtrate, water, and steam.

According to a seventh aspect of the present invention, there is provided the spray drying apparatus for dehydrated filtrate according to any one of the first to sixth aspects, including: a washing liquid discharge line for discharging washing effluent from the washing unit.

According to an eighth aspect of the present invention, there is provided an air pollution control system including: a boiler for combusting a fuel; an air heater for recovering heat of flue gas discharged from the boiler through a flue gas duct; a precipitator for removing ash dust in the flue gas after the heat recovery; a desulfurizer for removing sulfur oxides contained in the dust-removed flue gas with an absorbent; a dehydrator for recovering gypsum from absorber slurry discharged from the desulfurizer; the spray drying apparatus according to any one of the first to seventh aspects for spraying dehydrated filtrate from the dehydrator; a flue gas introducing line branched from the flue gas duct for introducing part of the flue gas into the spray drying apparatus; a flue gas supply line for returning the flue gas contributed to drying in the spray drying apparatus to the flue gas duct; and a damper unit interposed in the flue gas introducing line and the flue gas supply line to stop the introduction and restart the returning of the flue gas, respectively.

Advantageous Effects of Invention

According to the present invention, the washing unit for washing the inside of the spray drying apparatus is provided. If spray failure occurs, the feeding of the flue gas into the spray drying apparatus is stopped and then the spray nozzle and the inside of the apparatus body can be thereby washed without an operator entering the inside of the apparatus body.

DESCRIPTION OF EMBODIMENTS

Preferred embodiments of the present invention will be described below in detail with reference to the accompanying drawings. Note that the present invention is not limited by these embodiments. Moreover, the present invention includes, when there are a plurality of embodiments, those obtained by combining such embodiments one another.

First Embodiment

Figure 1:
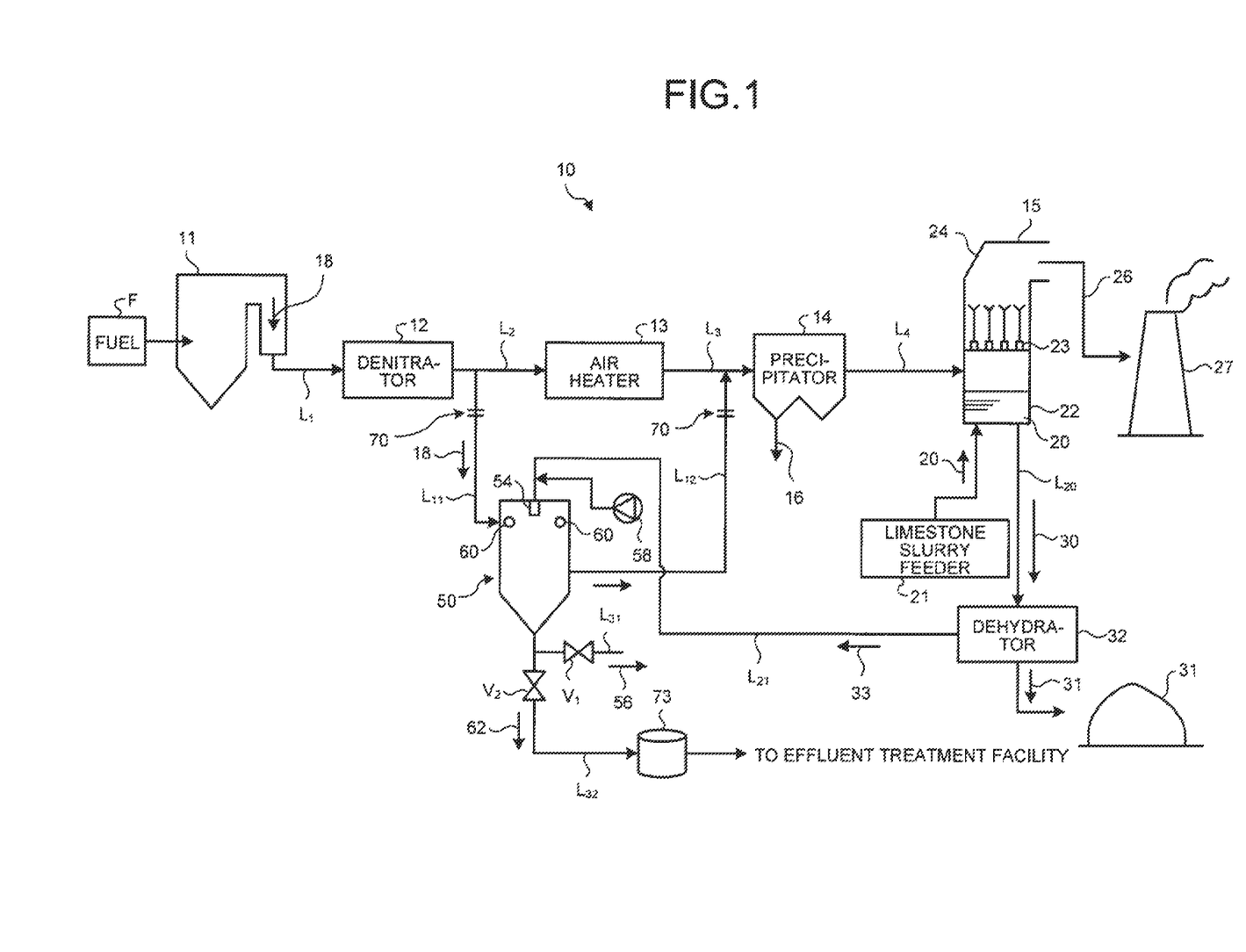
FIG. 1 is a schematic configuration diagram of an air pollution control system according to a first embodiment.

FIG. 1 is a schematic configuration diagram of an air pollution control system according to the first embodiment. An air pollution control system 10 illustrated in FIG. 1 is an apparatus for removing toxic substances such as nitrogen oxides ($NO_x$), sulfur oxides ($SO_x$), and mercury (Hg) from flue gas 18 from a boiler 11 such as a coal combustion boiler that uses coal as a fuel, or a fuel oil combustion boiler that uses heavy oil as a fuel, for example.

The air pollution control system 10 includes: the boiler 11 for combusting a fuel F; a denitrator 12 for removing nitrogen oxides in the flue gas 18 from the boiler 11; an air heater 13 for recovering heat of the denitrated flue gas 18; a precipitator 14 for removing ash dust in the heat-recovered flue gas 18 as precipitated ash 16; a desulfurizer 15 for removing sulfur oxides contained in the dust-removed flue gas 18 with limestone slurry 20, which is an absorbent; a dehydrator 32 for recovering gypsum 31 from absorber slurry 30 discharged from the desulfurizer 15; a spray drying apparatus 50 (spray drying apparatuses 50A to 50C to be described later) that includes spray means for spraying dehydrated filtrate 33 from the dehydrator 32; and a flue gas introducing line $L_{11}$ for introducing part of the flue gas 18 into the spray drying apparatus 50. This allows the dehydrated filtrate 33 from which the gypsum 31 has been recovered to be spray-dried in the spray drying apparatus 50 with the introduced flue gas 18. Thus, no drainage of desulfurized effluent can be achieved with stability.

The denitrator 12 is an apparatus for removing nitrogen oxides in the flue gas 18 fed from the boiler 11 via a gas feed line $L_1$ and has a denitration catalyst layer (not shown) therein. A reducing agent injector (not shown) is disposed upstream of the denitration catalyst layer and a reducing agent is injected into the flue gas 18 from the reducing agent injector. Examples of the reducing agent may include ammonia, urea, and ammonium chloride. The nitrogen oxides in the flue gas 18 introduced into the denitrator 12 are brought into contact with the denitration catalyst layer, so that the nitrogen oxides in the flue gas 18 are decomposed into nitrogen gas ($N_2$) and water ($H_2O$) and removed. Mercury in the flue gas 18 has an increased proportion of water-soluble divalent mercury chloride as the chlorine (Cl) content increases, thereby allowing mercury to be collected more easily in the desulfurizer 15 to be described later.

Note that the above denitrator 12 is not an essential component. If the concentration of nitrogen oxides and the concentration of mercury in the flue gas 18 from the boiler 11 are extremely low or if these substances are not contained in the flue gas 18, the denitrator 12 can be omitted.

The air heater 13 is a heat exchanger for recovering heat in the flue gas 18 fed via a flue gas feed line $L_2$ after the nitrogen oxides are removed therefrom in the denitrator 12. The temperature of the flue gas 18, which has been passed through the denitrator 12, is in a range of about 300° C. to 400° C., which is high. Thus, heat exchange is performed by the air heater 13 between the high-temperature flue gas 18 and room-temperature combustion air. The combustion air now having a high temperature by the heat exchange is fed to the boiler 11. On the other hand, the flue gas 18 heat-exchanged with the room-temperature combustion air is cooled to about 150° C.

The precipitator 14 serves to remove ash dust in the flue gas 18 fed via a gas feed line $L_3$ after the heat recovery. Examples of the precipitator 14 may include an inertial precipitator, a centrifugal precipitator, a filter type precipitator, an electronic precipitator, and a scrubbing precipitator, although the precipitator 14 is not limited to any particular precipitator.

The desulfurizer 15 is an apparatus for performing wet-type removal of sulfur oxides in the flue gas 18 fed via a gas feed line $L_4$ after the removal of ash dust. In this desulfurizer 15, the limestone slurry 20 (aqueous solution obtained by dissolving limestone powder in water) is used as an alkali absorbent. The temperature inside the apparatus is controlled to be about 30 to 80° C. The limestone slurry 20 is fed from a limestone slurry feeder 21 to a bottom portion 22 of the desulfurizer 15. The limestone slurry 20 fed to the bottom portion 22 of the desulfurizer 15 is sent to a plurality of nozzles 23 in the desulfurizer 15 via an absorbent supply line (not shown) and jetted from the nozzles 23 toward a top portion 24. Gas-liquid contact is made between the flue gas 18 ascending from the bottom portion 22 of the desulfurizer 15 and the limestone slurry 20 jetted from the nozzles 23, causing the sulfur oxides and the mercury chloride in the flue gas 18 to be absorbed by the limestone slurry 20 and thus separated and removed from the flue gas 18. The flue gas 18 purified by the limestone slurry 20 is discharged from the top portion 24 of the desulfurizer 15 as purified gas 26 and discharged to the outside of the system through a stack 27.

Inside the desulfurizer 15, sulfur oxides, $SO_x$, in the flue gas 18 and the limestone slurry 20 cause a reaction represented by the following formula (1).

$$CaCO_3+SO_2+0.5H_2O \rightarrow CaSO_3.0.5H_2O+CO_2 \quad (1)$$

Furthermore, the limestone slurry 20, which has absorbed $SO_x$ in the flue gas 18, is oxidized by air (not shown) fed to the bottom portion 22 of the desulfurizer 15 to cause a reaction represented by the following formula (2) with air.

$$CaSO_3.0.5H_2O+0.5O_2+1.5H_2O \rightarrow CaSO_4.2H_2O \quad (2)$$

In this manner, $SO_x$ in the flue gas 18 are captured in the form of gypsum, $CaSO_4.2H_2O$, in the desulfurizer 15.

While the liquid retained in the bottom portion 22 of the desulfurizer 15 is pumped and used as the limestone slurry 20 as described above, gypsum, $CaSO_4.2H_2O$, is mixed into the pumped limestone slurry 20 along with the operation of the desulfurizer 15 according to the reaction formulas (1) and (2). Hereinafter, the pumped limestone-gypsum slurry (limestone slurry into which gypsum has been mixed) is referred to as absorbent.

The absorber slurry (limestone-gypsum slurry) 30 used for the desulfurization is discharged to the outside from the bottom portion 22 of the desulfurizer 15, sent to the dehydrator 32 via an absorbent line $L_{20}$, and dehydrated in the dehydrator 32. In addition to gypsum, the absorber slurry 30 contains heavy metals such as mercury and halogen ions such as $Cl^-$, $Br^-$, $I^-$, or $F^-$.

The dehydrator 32 serves to separate the absorber slurry 30 into a solid component including the gypsum 31 and the dehydrated filtrate 33, which is a liquid component. Examples of the dehydrator 32 may include a belt filter, a centrifuge, and a decanter type centrifugal settler. The gypsum 31 is separated from the absorber slurry 30 discharged from the desulfurizer 15 by the dehydrator 32. At this time, mercury chloride in the absorber slurry 30 is separated from liquid together with the gypsum 31 while being adsorbed to the gypsum 31. The separated gypsum 31 is discharged to the exterior of the system (hereinafter referred to as "the outside of the system").

On the other hand, the dehydrated filtrate 33, which is the separated liquid, is sent to the spray drying apparatus 50 via a dehydrated filtrate feed line $L_{21}$. Note that the dehydrated filtrate 33 may be temporarily retained in a filtrate tank (not shown).

The spray drying apparatus 50 includes: gas introduction means for introducing part of the flue gas 18 via the flue gas introducing line $L_{11}$ branched from the flue gas feed line $L_2$, which is a main line for the flue gas 18 from the boiler 11; and spray means for sprinkling or spraying the dehydrated filtrate 33. The sprinkled or sprayed dehydrated filtrate 33 is dried by evaporation by means of the heat of the introduced flue gas 18. Note that the sign $L_{12}$ denotes a flue gas supply line for returning the flue gas 18 contributed to the drying in the spray drying apparatus 50 to the gas feed line $L_3$.

According to the present invention, the dehydrated filtrate 33 obtained by recovering the gypsum 31 from the absorber slurry 30 is spray-dried. Thus, clogging in the spray means can be prevented from occurring.

More specifically, since the absorber slurry 30 itself is not sprayed, the amount of dried particles generated along with the evaporation of the desulfurized effluent can be significantly reduced. As a result, clogging caused by the adherence of the dried particles can be reduced. Moreover, mercury chloride is also separated and removed together with the gypsum 31 by the dehydration of the absorber slurry 30. Thus, the concentration of mercury in the flue gas 18 is prevented from increasing during the spraying of the effluent.

Moreover, part of the flue gas 18 flowing toward the air heater 13 is branched from the flue gas feed line $L_2$ via the flue gas introducing line $L_{11}$ according to the present embodiment. Thus, the temperature of the flue gas is high (350 to 400° C.) and thus the spray drying of the dehydrated filtrate 33 can be performed efficiently.

Note that the dehydrated filtrate 33 is sprayed into the apparatus body by compressed air 59 fed from a compressor 58 at a predetermined flow rate and with a spray droplet particle size.

Figure 2:
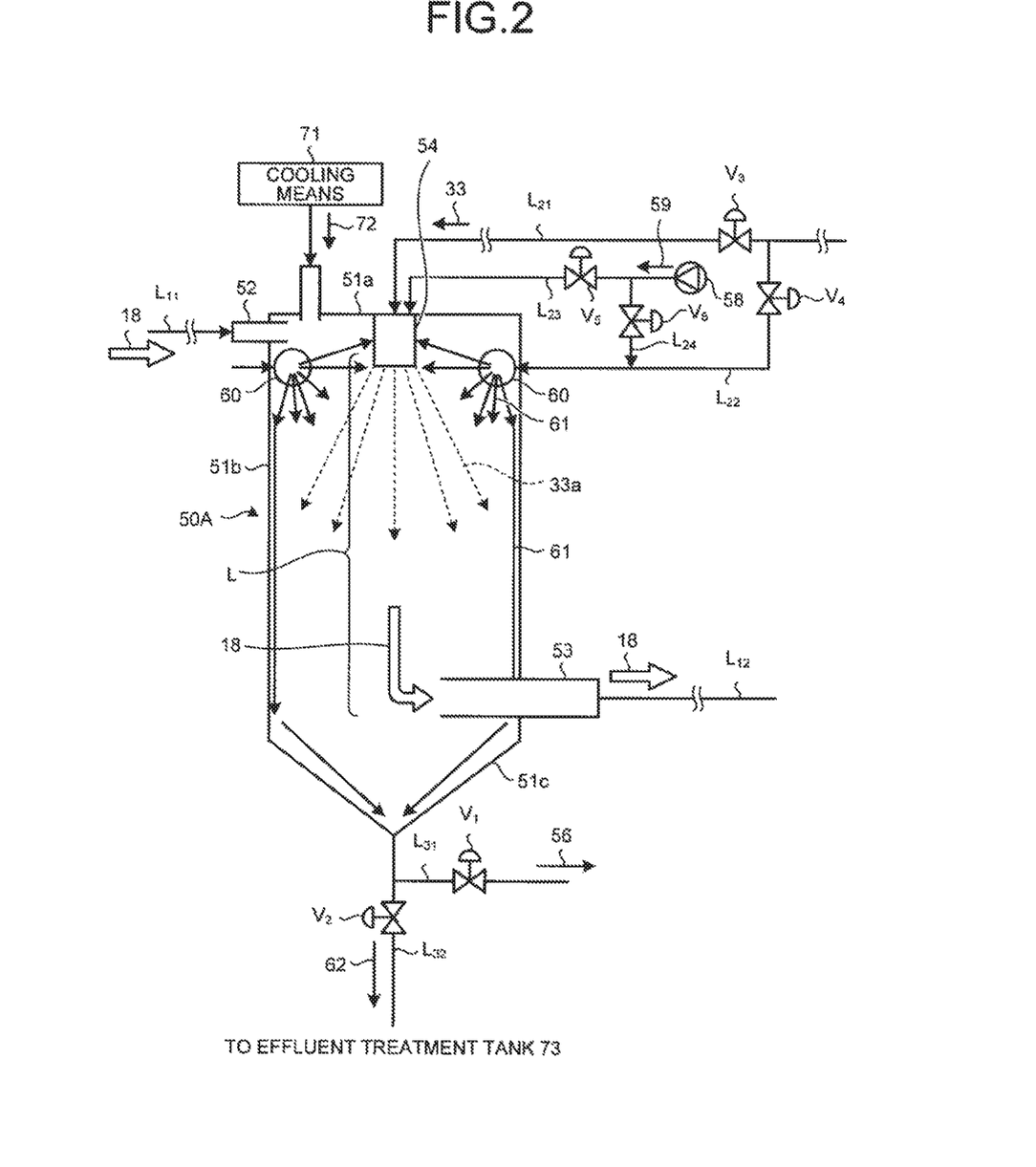
FIG. 2 is a schematic view illustrating a spray drying apparatus for dehydrated filtrate according to the first embodiment.
Figure 3:
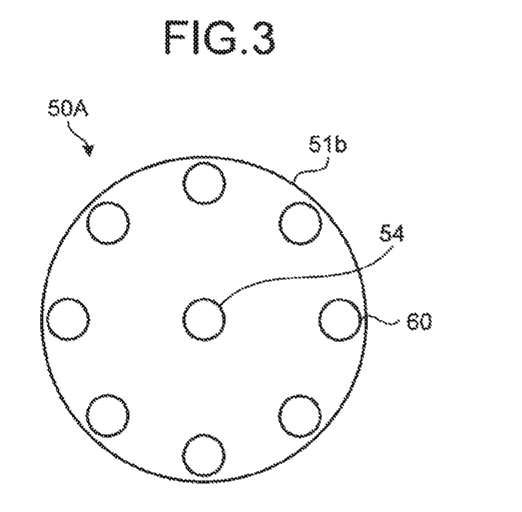
FIG. 3 is a cross-sectional view illustrating a main part of the spray drying apparatus for dehydrated filtrate.

FIG. 2 is a schematic view illustrating the spray drying apparatus for dehydrated filtrate according to the present embodiment. FIG. 3 is a cross-sectional view illustrating a main part of the spray drying apparatus for dehydrated filtrate.

As shown in FIG. 2, the spray drying apparatus 50A of the present embodiment includes: a gas introducing port 52 provided in a portion of a side wall 51b near a top (lid) 51a of the spray drying apparatus body, for introducing the flue gas 18 to dry spray liquid 33a of the dehydrated filtrate 33; a spray nozzle 54 hung down from the top (lid) 51a of the spray drying apparatus body, for spraying the dehydrated filtrate 33; a spray drying region L formed in the spray drying apparatus body, for use in drying the sprayed dehydrated filtrate 33 with the flue gas 18; a gas discharge port 53 provided in a portion of the side surface 51b near the bottom of the spray drying apparatus body, for discharging the flue gas 18 contributed to the spray drying toward the gas feed line $L_3$, which is a main flue gas duct; and a wash nozzle 60, which is a washing unit for washing the spray nozzle 54 and the inside of the apparatus body with washing liquid.

Here, eight wash nozzles 60 are provided in the present embodiment along the inner surface of the side wall 51b of the apparatus body as shown in FIG. 3.

Here, for the introduction of the flue gas 18, the flue gas 18 may be introduced into the spray drying apparatus 50A by means of a difference in pressure loss between the flue gas feed line $L_2$ and the flue gas introducing line $L_{11}$ or the flue gas 18 may be introduced with an induced draft fan, or the like, as needed.

The dehydrated filtrate 33 is jetted as the spray liquid 33a into the flue gas 18 having laminar flow from the spray nozzle 54.

Here, the spray nozzle 54 is not limited to any particular type as long as it can spray the dehydrated filtrate 33 with a predetermined droplet diameter. For example, spray means such as a two-fluid nozzle or a rotary atomizer can be used. Note that the two-fluid nozzle is suitable for spraying a relatively small amount of dehydrated filtrate 33 and the rotary atomizer is suitable for spraying a relatively large amount of dehydrated filtrate 33.

Moreover, the number of such nozzles is not limited to one. A plurality of nozzles may be provided according to the amount of treatment.

In the present embodiment, to facilitate spraying, the compressor 58 is used to introduce the compressed air 59 into the nozzle 54 via an air feed line $L_{23}$. Here, the compressed air 59 and the dehydrated filtrate 33 are separately introduced into the spray nozzle 54 and sprayed as the spray liquid 33a in the body. Note that the sign $V_5$ denotes a switching valve for switching the introduction of air.

To facilitate satisfactory drying of the spray liquid 33a sprayed from the spray nozzle 54, the length of the spray drying region L inside the column of the spray drying apparatus 50A is changed according to the evaporation rate of the filtrate so as to prolong the stay time of the spray liquid 33a because the filtrate is desulfurized filtrate having a boiling point higher than that of normal water.

Here, the flue gas 18 contributed to the spray drying is discharged from the gas discharge port 53 provided in the portion of the side wall 51b near the bottom of the spray drying apparatus 50A.

When being sprayed from the spray nozzle 54, the dehydrated filtrate 33 comes in contact with the introduced flue gas 18 in the spray drying region L, thereby being spray-dried.

By spray-drying the dehydrated filtrate 33 in this manner, no drainage of the dehydrated filtrate 33 from the desulfurizer 15 can be achieved.

Since the dehydrated filtrate 33 contains various kinds of salts, its spray-dried solid 56 is discharged from a discharge hopper 51c provided at the bottom of the spray drying apparatus body through a solid discharge line $L_{31}$.

The wash nozzle 60 provided in an upper portion inside the apparatus body performs air purging excluding the period of washing in order to prevent blockage due to the influence of the spray-dried solid 56, or the like.

For the air purging, air 59 from the compressor 58 is caused to flow in via a line $L_{24}$. Note that a switching valve $V_6$ for switching the introduction of air is interposed in the line $L_{24}$.

When the inside of the apparatus body is washed with the wash nozzle 60, washing is performed while stopping the introduction of air and feeding the dehydrated filtrate 33.

Thus, when washing is performed, the dehydrated filtrate 33 is fed to the wash nozzle 60 via a washing liquid line $L_{22}$ branched from the dehydrated filtrate feed line $L_{21}$. Note that the signs $V_3$ and $V_4$ denote switching valves for switching the feeding of the dehydrated filtrate 33.

Washing liquid 61, which is the dehydrated filtrate 33 sprayed from the wash nozzle 60, washes the inner wall surface of the apparatus body, the gas discharge port 53, the spray nozzle 54, and the inner surface of the hopper 51c at the bottom of the apparatus body, and removes by washing extraneous substances such as the adhered spray-dried solid 56, so as to restore the above portions to a clean state.

Figure 4:
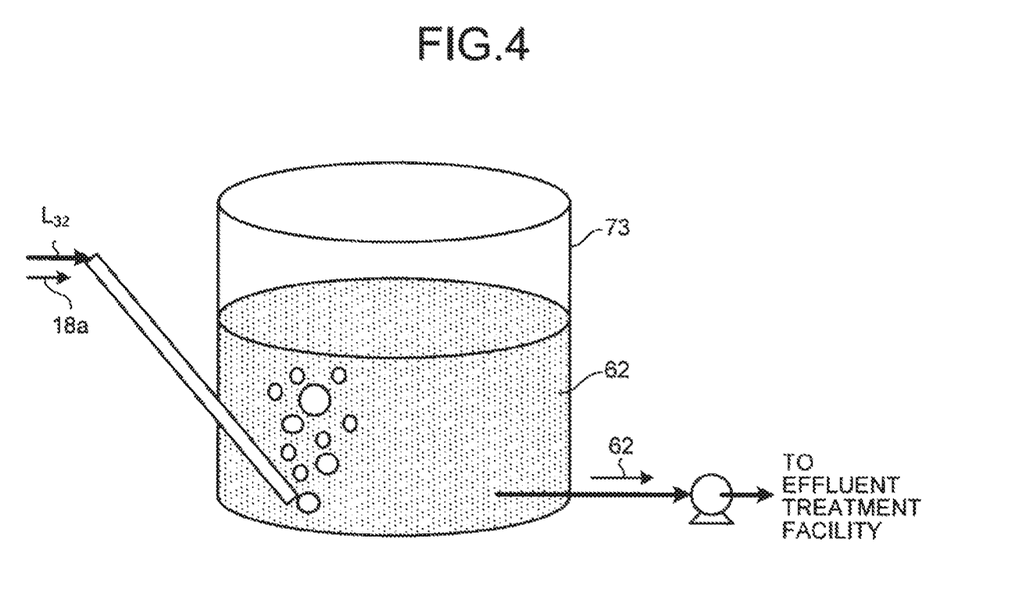
FIG. 4 is a schematic view illustrating a treatment tank into which washing effluent and untreated flue gas are introduced.

FIG. 4 is a schematic view illustrating a treatment tank into which washing effluent and untreated flue gas are introduced.

As shown in FIG. 4, washing effluent 62 used for the washing is discharged from an end of the hopper 51c at the bottom of the apparatus body and introduced into an effluent treatment tank 73 via a washing liquid discharge line $L_{32}$.

Since the spray-dried solid 56 generated during the drying is discharged through the solid discharge line $L_{31}$, switching valves $V_1$ and $V_2$ are switched so that no washing effluent 62 flows into the solid discharge line $L_{31}$.

Note that the washing effluent 62 may be treated in an effluent treatment facility inside or outside the system after being retained in the effluent treatment tank 73.

Alternatively, the washing effluent 62 may be introduced into the absorbent in the bottom portion 22 of the desulfurizer 15. Alternatively, the washing effluent 62 may be introduced into the dehydrator 32 for dehydrating the absorber slurry 30 from the desulfurizer 15.

Figure 5:
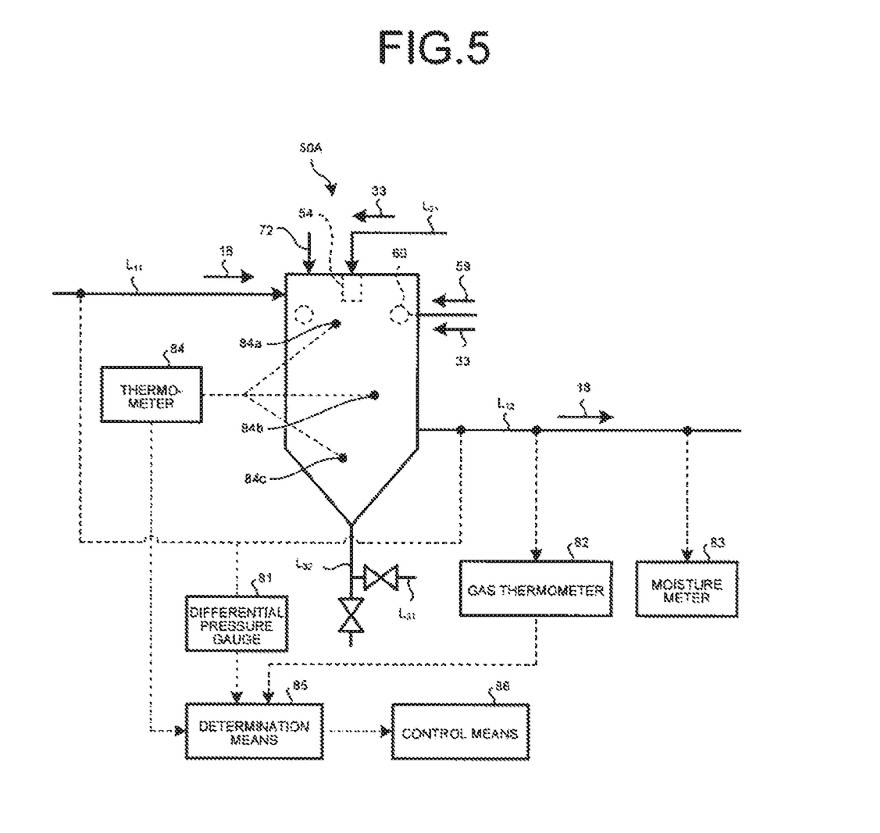
FIG. 5 is a schematic view illustrating the spray drying apparatus provided with a detection unit.

As shown in FIG. 5, the presence or absence of failure in spraying and drying due to, for example, the generation of scale inside the spray drying apparatus is detected by a detection unit such as various sensors.

Any one of, or a combination of, a differential pressure gauge 81, a gas thermometer 82, a gas moisture meter 83, a thermometer 84 on the surface of the apparatus body, etc., can be used as the detection unit for detecting such failure, although the present invention is not limited thereto.

FIG. 5 is a schematic view illustrating one example of the spray drying apparatus provided with various sensors.

As shown in FIG. 5, pressure gauges are provided in the flue gas introducing line $L_{11}$ and the flue gas supply line $L_{12}$ for measuring a pressure difference between the inlet and the outlet for introducing and discharging gas in the spray drying apparatus 50A. The pressure difference in the flue gas 18 is then detected by the differential pressure gauge 81.

For example, whether or not the pressure difference has been increased higher than a predetermined pressure is determined by a determination unit 85.

Moreover, the gas thermometer 82 is provided in the flue gas supply line $L_{12}$ for measuring the outlet gas temperature of the flue gas 18 discharged from the spray drying apparatus 50A. In this manner, the gas temperature of the flue gas 18 on the outlet side is detected by the gas thermometer 82.

Whether or not the gas temperature has been increased higher than a predetermined temperature is then determined by the determination unit 85. When the temperature of the introduced flue gas is 350° C. and the spay drying has been performed well, for example, the discharge temperature of the flue gas on the outlet side is decreased as low as 170° C. When the discharge temperature is 200° C., for example, it can be determined to be failure in spray drying.

Moreover, the moisture meter 83 for measuring a moisture concentration in the outlet gas, which is the flue gas 18 discharged from the spray drying apparatus 50A, is provided in the flue gas supply line $L_{12}$. In this manner, the gas moisture in the flue gas 18 is detected by the moisture meter 83.

Whether or not the moisture concentration has been decreased lower than a predetermined concentration is then determined by the determination unit 85. When spray drying has been performed well, the moisture in the flue gas is 20 Vol %. However, when the moisture in the flue gas is 17 or 18 Vol %, for example, it can be determined to be failure in spray drying since no droplets can be evaporated.

Alternatively, such failure may be detected from abnormality in the outer surface temperature of the spray drying apparatus body, or the like. Accordingly, temperature sensors (for example, thermocouples, or the like) 84a, 84b, 84c are attached to predetermined positions on the outer surface of the side wall 51b of the apparatus body, so that the surface temperature is detected by the thermometer 84 on the surface of the apparatus body.

Whether or not the temperature has been decreased lower than a predetermined temperature due to the adherence of the spray-dried material to the inner surface, for example, is determined by the determination unit 85.

Other than the thermocouples, temperature detection may be performed with a noncontact sensor, or a combination of a contact type sensor and a noncontact type temperature sensor may be used.

The present embodiment includes: the various sensors 81 to 84 for detecting spray failure in the spray nozzle 54 or dry failure; the determination unit 85 for determining whether the spraying and drying states of the dehydrated filtrate 33 are good or bad on the basis of the detection results from the sensors; and a control unit 86 for suggesting or instructing the washing of the spray nozzle 54 and the inside of the apparatus body by the wash nozzle 60 when it is determined to be spray and dry failure as a result of the determination made by the determination unit 85.

Moreover, as shown in FIG. 1, dampers 70, 70 are provided in the flue gas introducing line $L_{11}$ and the flue gas supply line $L_{12}$ in the air pollution control system 10 in order to stop the inflow of the flue gas 18 when it is determined to be failure in spray drying.

Moreover, after the introduction of the flue gas 18 is stopped, cooling gas 72 is introduced into the apparatus body by a cooling unit 71 in order to cool the inside of the apparatus body heated by the air blow of the flue gas 18 in preparation for washing. The inside of the apparatus body is thereby cooled to a predetermined temperature (for example, 40 to 50 degrees) or lower.

For example, an air-cooling fan, a two-fluid nozzle compressor, general service air, or the like, can be used as the cooling unit 71. Also, after the inside of the apparatus body is cooled to the predetermined temperature, cooling of the inside may be facilitated by jetting the dehydrated filtrate 33 from the wash nozzle 60 and the spray nozzle 54.

When the introduction of the flue gas 18 is stopped, untreated gas 18a remained in the apparatus body is sent to the effluent treatment tank 73 via the washing liquid discharge line $L_{32}$. Then, the gas 18a is caused to bubble, and treated with the washing effluent 62.

Furthermore, during the rapid cooling by the cooling unit 71 or the washing liquid, for example, gas having a volume larger than or equal to the internal capacity of the apparatus body is generated inside the apparatus body. The untreated gas 18a is sent into the effluent treatment tank 73 and treated therein without being allowed to escape into the outside of the system.

A procedure performed after spray drying is determined to be failure during the operation of the spray drying apparatus will be described next.

1) Step 1

Typically, spray drying is performed by introducing the dehydrated filtrate 33 and the flue gas 18 into the spray drying apparatus 50. At this time, the damper 70 is being opened. Air purging is also performed during such spray drying by feeding air 59 to the wash nozzle 60.

2) Step 2

Failure in spray drying is determined by the determination unit 85 on the basis of detection made by various sensors.

The control unit 86 suggests or instructs a stopping operation according to the results from the determination unit 85, thus stopping the feeding of the dehydrated filtrate 33 to the spray nozzle 54.

3) Step 3

The damper 70 is switched so as to stop the inflow of the flue gas 18 into the spray drying apparatus.

4) Step 4

The valve $V_1$ in the solid discharge line $L_{31}$ is closed to stop the discharge of the spray-dried solid 56, whereas the valve $V_2$ in the washing liquid discharge line $L_{32}$ is opened to prepare for the discharge of the washing effluent 62.

Moreover, the untreated gas 18a, resulted from the stop of the inflow of the flue gas 18, is introduced into the effluent treatment tank 73 through the washing liquid discharge line $L_{32}$ and treated.

5) Step 5

The cooling gas 72 is fed into the apparatus body by the cooling unit 71 and the inside is cooled to the predetermined temperature.

6) Step 6

The dehydrated filtrate 33 is jetted from the wash nozzle 60 to wash the spray nozzle 54 and the inside of the apparatus.

7) Step 7

The washing effluent 62 is discharged to the effluent treatment tank 73 through the washing liquid discharge line $L_{32}$. The effluent is either treated in the effluent treatment facility inside the system or returned to the absorber or the dehydrator.

8) Step 8

Once a predetermined washing operation is performed for a predetermined period of time, it is determined to be the end of washing.

Additionally, an operator or the like may enter the inside of the apparatus body through a manhole to check the inside as needed.

9) Step 9

A recovery operation is performed.

Various lines are switched.

The gas damper 70 is opened to start the introduction of the flue gas 18.

Thereafter, once a predetermined temperature is achieved, the dehydrated filtrate 33 is fed to start spray drying.

The spray drying apparatus for dehydrated filtrate according to the present embodiment allows for washing maintenance in a short period of time by remote control without requiring an operator to enter the inside of the apparatus body.

Moreover, no washing liquid is discharged to the outside of the system. Also, untreated gas remained after the stop of spray drying is treated, thus being prevented from being discharged to the outside.

Whether spray drying has been performed well or not is determined with various sensors, thus allowing for washing maintenance in a short period of time by remote control.

Moreover, the inside of the apparatus is cooled by the cooling unit after the stop of spray drying, thus allowing washing by the washing unit to be performed immediately.

Second Embodiment

Figure 6:
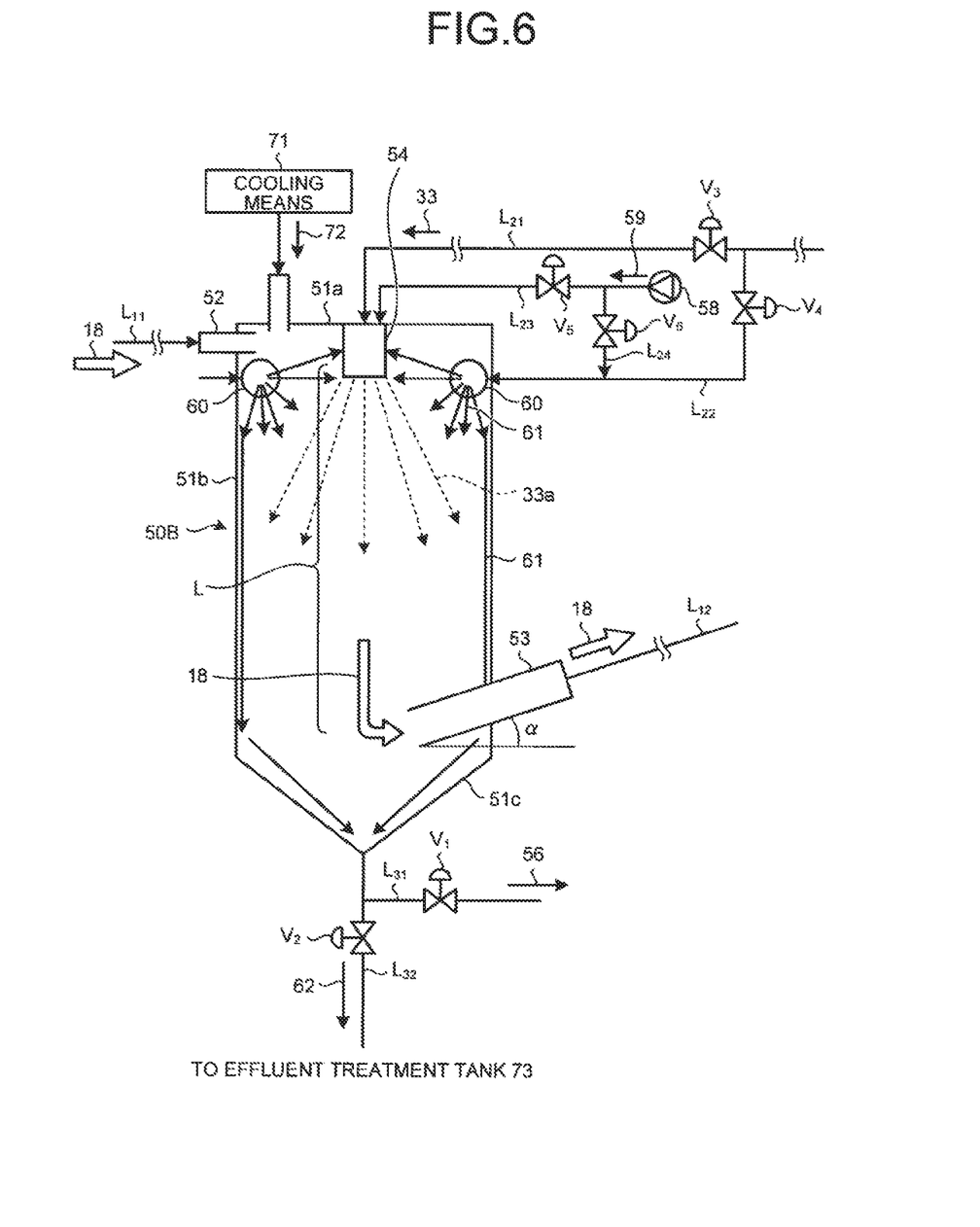
FIG. 6 is a schematic view illustrating a spray drying apparatus for dehydrated filtrate according to a second embodiment.

FIG. 6 is a schematic view illustrating a spray drying apparatus for dehydrated filtrate according to the second embodiment. Note that components identical to those in the spray drying apparatus 50A according to the first embodiment will be denoted by the same reference numerals and the description thereof will be omitted.

As shown in FIG. 6, the spray drying apparatus 50B of the present embodiment is configured such that the discharge port 53 of the flue gas 18, provided in a lower portion of the apparatus body, is inclined toward an upper side of the spray drying apparatus body from the horizontal direction by a predetermined angle (a degrees).

This prevents the dehydrated filtrate 33, which is the washing liquid dropped from the wash nozzle 60, and the washing effluent 62 from flowing out to the flue gas supply line $L_{12}$ connected to the gas feed line $L_3$, which is the flue gas duct.

Third Embodiment

Figure 7:
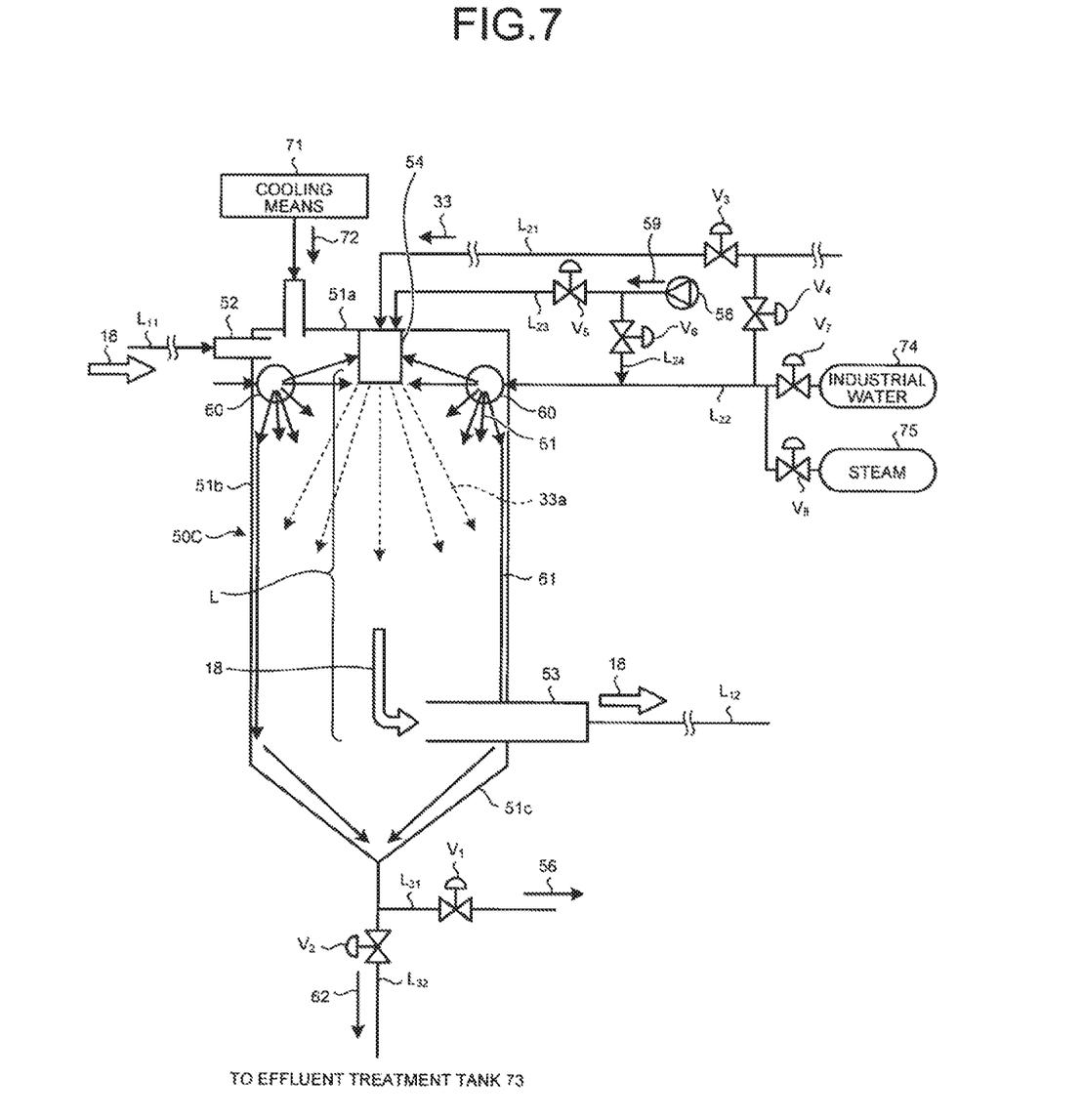
FIG. 7 is a schematic view illustrating a spray drying apparatus for dehydrated filtrate according to a third embodiment.

FIG. 7 is a schematic view illustrating a spray drying apparatus for dehydrated filtrate according to the third embodiment. Note that components identical to those in the spray drying apparatus 50A according to the first embodiment will be denoted by the same reference numerals and the description thereof will be omitted.

As shown in FIG. 7, the spray drying apparatus 50C of the present embodiment is configured such that washing liquid to be fed to the wash nozzle 60 is not limited to the dehydrated filtrate 33, and any one or more of the dehydrated filtrate 33, water (industrial water) 74, and steam 75 are used. When those are used in combination, switching can be achieved by switching valves $V_7$ and $V_8$ as desired.

Thus, a type of washing liquid can be selected according to various cases such as where the effluent can be discharged or not or where scale can be easily cleaned off or not.

REFERENCE SIGNS LIST 10 air pollution control system
11 boiler
12 denitrator
13 air heater
14 precipitator
15 desulfurizer
16 precipitated ash
18 flue gas
30 absorber slurry
32 dehydrator
33 dehydrated filtrate
50, 50A to 50C spray drying apparatus
52 gas introducing port
53 gas discharge port
54 spray nozzle
59 air
60 washing unit (wash nozzle)
62 washing effluent
70 damper
71 cooling unit

The invention claimed is:

1. A method of spray drying and washing using a spray drying apparatus,
when spray-drying is performed, comprising:
spraying dehydrated filtrate supplied from a dehydrator via a dehydrated filtrate feed line, from a spray nozzle hung down from a top side of the spray drying apparatus into a spray drying apparatus body;
introducing a part of flue gas into an introduction port of the spray drying apparatus to dry the dehydrated filtrate sprayed from the spray nozzle and thereafter discharging the part of flue gas from a discharge port of the spray drying apparatus;
introducing a compressed air via a first air feed line into the spray nozzle to facilitate the spraying and into a wash nozzle provided on an inside wall of the spray draying apparatus via a second air feed line to perform air purging during the spray drying; and
detecting spray failure or dry failure by a detection unit, and
when washing the spray nozzle is performed in a case that the spray failure or the dry failure is determined as a result of the detecting, comprising:
suggesting and instructing by a controller to stop feeding of the dehydrated filtrate to the spray nozzle, stop inflow of the flue gas into the spray drying apparatus, stop the introduction of the compressed air to the wash nozzle and thereafter feeding washing liquid to the wash nozzle via a washing liquid feed line branched from the filtrate feed line, and jet the washing liquid from the wash nozzle to wash the spray nozzle and an inside of the spray drying apparatus body.

2. The method of spray drying and washing according to claim 1, when washing the spray nozzle is performed, comprising:
introducing cooling gas into the spray dying apparatus body by a cooling unit to cool the inside of the spray drying apparatus body heated by air blow of the flue gas to a predetermined temperature.

3. The method of spray drying and washing according to claim 1,
wherein the washing liquid is any one of, or a combination of, the dehydrated filtrate, water and steam.

4. A method of controlling air pollution, comprising:
combusting a fuel;
recovering heat of flue gas discharged after the combustion of the fuel;
removing ash dust in the flue gas after the heat recovery;
removing sulfur oxides contained in the dust-removed flue gas with an absorbent;
recovering gypsum from absorbent slurry discharged after the removal of the sulfur oxides;
spray drying and washing according to claim 1.

* * * * *